US008079746B2

(12) United States Patent
Lundberg et al.

(10) Patent No.: US 8,079,746 B2
(45) Date of Patent: Dec. 20, 2011

(54) CONCRETE CONTAINMENT AND WASHOUT APPARATUS

(76) Inventors: Derald Lundberg, Red Deer (CA); Steve Giesbrecht, Leslieville (CA)

( * ) Notice: Subject to any disclaimer, the term of this patent is extended or adjusted under 35 U.S.C. 154(b) by 505 days.

(21) Appl. No.: 12/404,671

(22) Filed: Mar. 16, 2009

(65) Prior Publication Data

US 2010/0232253 A1 Sep. 16, 2010

(51) Int. Cl.
*B28C 7/16* (2006.01)
*B65G 11/00* (2006.01)

(52) U.S. Cl. ................................ 366/68; 193/6; 193/10

(58) Field of Classification Search .................... 366/68, 366/41; 193/5, 6, 10, 21; 134/104.4, 111, 134/168 R
See application file for complete search history.

(56) References Cited

U.S. PATENT DOCUMENTS 1,026,641 A * 5/1912 Gardner ........................ 193/2 R
3,068,981 A 12/1962 Stegmeier et al.
3,249,192 A * 5/1966 Buskirk ............................ 193/4
3,542,179 A * 11/1970 Prichard ........................... 193/5
3,606,278 A * 9/1971 Winfrey, II ...................... 366/68
4,007,821 A * 2/1977 Schiffelbein ...................... 193/4
4,054,194 A * 10/1977 Davis .............................. 193/10
4,458,800 A * 7/1984 Christenson ..................... 193/10
4,711,334 A * 12/1987 Barry et al. ....................... 193/6
4,919,249 A * 4/1990 Alexander ........................ 193/6
5,186,299 A * 2/1993 Stimson ............................ 193/4
5,354,128 A * 10/1994 Lewis ............................. 366/68
5,531,518 A * 7/1996 Alves .............................. 366/68
5,605,398 A * 2/1997 Cronquist ....................... 366/68
5,685,978 A * 11/1997 Petrick et al. ................. 210/241
5,927,461 A * 7/1999 Jamieson .......................... 193/6
6,106,141 A * 8/2000 Bruun ............................. 366/68
6,155,277 A * 12/2000 Barry ......................... 134/104.4
RE37,018 E * 1/2001 Cronquist ....................... 366/68
6,491,070 B1 * 12/2002 Espina Frutos ................. 141/93
6,783,007 B2 * 8/2004 Arbore .......................... 209/421
6,866,047 B1 * 3/2005 Marvin ........................ 134/22.1
6,868,953 B1 * 3/2005 Thompson ....................... 193/10
7,178,657 B1 * 2/2007 Hafen et al. ...................... 193/4
7,594,524 B2 * 9/2009 DeCollibus et al. ............ 141/86
7,648,015 B2 * 1/2010 Gillmore et al. .................. 193/5
2006/0000490 A1 * 1/2006 Barragan et al. ................ 134/10
2007/0002677 A1 * 1/2007 DeCollibus et al. ............ 366/68
2010/0232253 A1 * 9/2010 Lundberg et al. ............... 366/68

* cited by examiner

*Primary Examiner* — Tony G Soohoo
(74) *Attorney, Agent, or Firm* — Maxey Law Offices, PLLC; Stephen Lewellyn

(57) ABSTRACT

A method, a system and an apparatus for removing cement residue located within a concrete discharge chute and controlling the collection of debris and wash water, in a concrete mixing truck. The concrete discharge chute comprises a main chute and an end chute connected to the main chute via a hinged connection. In addition, a barrier plate having a rubber seal is connected to the end chute. When concrete discharge is completed, the barrier plate automatically prevents the discharge of debris by closing off the discharge chute when the end chute is raised into an upright and secured position. The barrier plate also has an optimally placed opening to control material flow along the main chute. The opening is fitted with a valve which may be connected to a drain hose to collect wash water into a collection tank securely positioned on the concrete truck.

7 Claims, 4 Drawing Sheets

CONCRETE CONTAINMENT AND WASHOUT APPARATUS

FIELD OF THE INVENTION

The present invention relates generally to concrete truck discharge chutes, and more particularly, relating to a concrete containment and washout apparatus for use in connection with a concrete discharge chute to permit controlled rinsing of a concrete chute with waste collection.

BACKGROUND OF THE INVENTION

Concrete mixing trucks transport concrete in large rotating mixing drums and deliver concrete to a desired location by utilizing a discharge chute. The discharge chute is mounted on the truck via hinged connections that enable the discharge chute to be aligned into a particular position to direct the discharge of cement from the concrete mixing truck.

After the concrete is delivered, the discharge chute is washed to prevent the hardening of concrete on the chute surface. Some cement residue may be removed from the truck by washing. Some debris, for example, sand and gravel, may be held in the chute to be disposed of when the truck returns to the plant. Some traditional concrete mixing trucks utilize screens or pumps which may eventually become clogged with debris. Other mixing trucks are designed so that cleaning out all sand and gravel includes disposal of this material at the building site. A problem encountered during washing of the discharge chute is the flow of the water and cement onto the road or the site where concrete is being poured. Ultimately, undesired cement patches may be formed on the road or at a construction site. Sometimes, a concrete mixing truck has to be designed to include a separate container on the truck to store the sand and rocks until the truck returns to the plant. Thus, in general, the onsite cleaning of cement residue and disposing of rocks and sand from concrete mixing trucks present some unresolved problems.

Accordingly, there is a need for efficiently removing cement residue located within a concrete discharge chute and controlling the collection of debris and wash water, in a concrete mixing truck.

SUMMARY OF THE INVENTION

The preferred embodiments of the present invention addresses this need by providing an apparatus for removing cement residue located within a concrete discharge chute and controlling the collection of debris and wash water, in a concrete mixing truck.

To achieve these and other advantages, in general, in one aspect, a concrete containment and chute washout apparatus for use in association with a concrete truck having a concrete discharge chute with a main chute and an end chute hingeable connected to the main chute for rotation between a lowered positioned where the main chute and end chute form an elongated chute for concrete discharge, and a raised position where the end chute is positioned above the main chute, is provided. The concrete containment and chute washout apparatus includes a barrier plate having a peripheral sealing edge, and a fluid passage through the barrier plate at an inwardly position from the peripheral sealing edge, and a seal located along the peripheral sealing edge. The barrier plate connectable to the end chute such that when the end chute is in the raised position, the barrier plate is positioned within the main chute with the seal providing a sealing contact between the peripheral sealing edge and an interior surface of the main chute forming a liquid tight barrier against the flow of material in the main chute. A container is positionable remotely of the barrier plate, and a hose is connectable to in fluid communication to the fluid passage and to the container for the passage of material from the main chute to the container.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
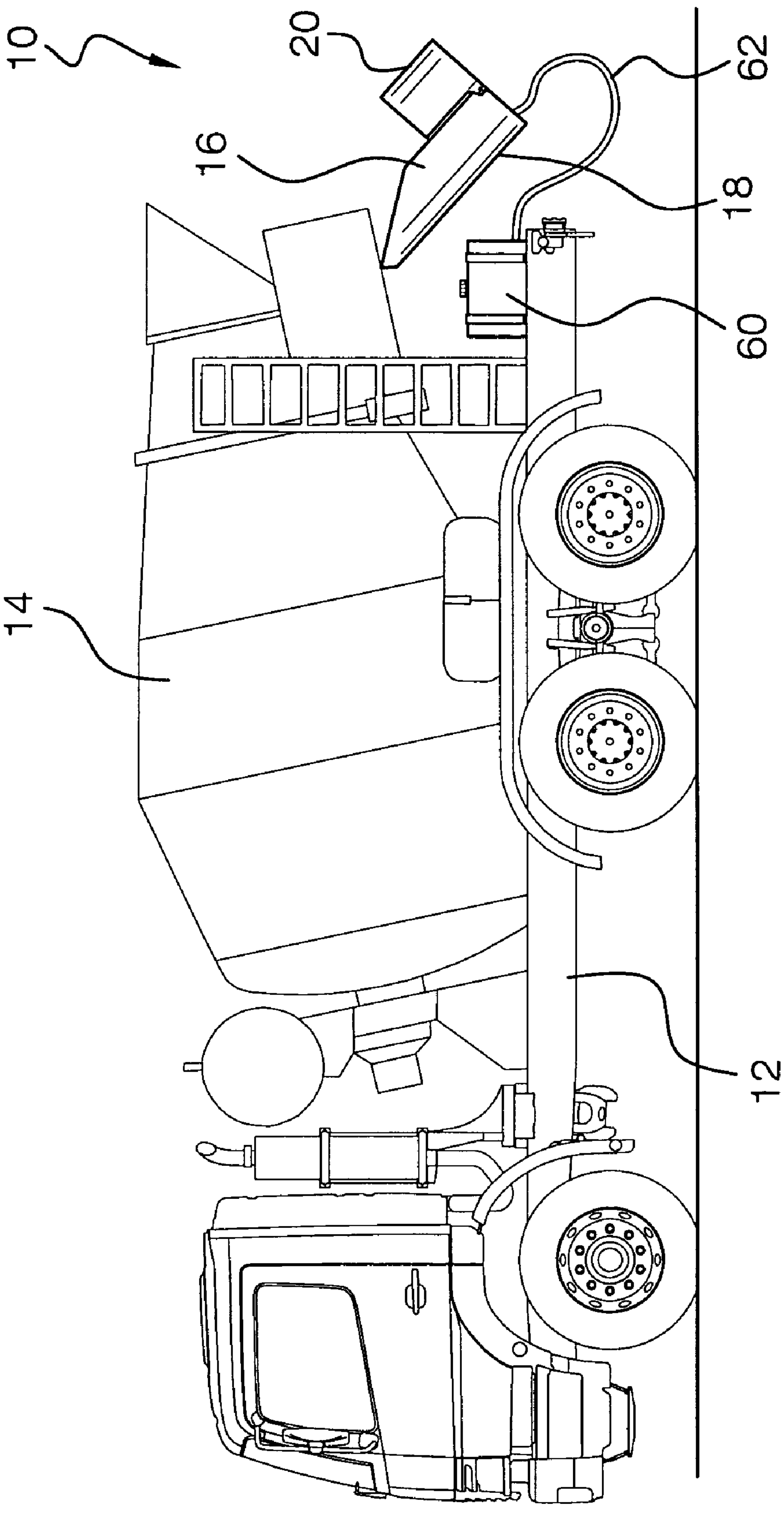
FIG. 1 is a diagrammatic view of a concrete truck having a concrete containment and washout apparatus constructed in accordance with the principles of the present invention.

Referring now to the drawings and, more particularly to FIG. 1 thereof, there is shown a concrete containment and chute washout apparatus 10 in combination with a conventional concrete mixer truck 12. As shown in FIG. 1, concrete mixer truck 12 includes a mixing drum 14 for mixing aggregate, sand and cement slurry together forming a liquid concrete mixture. The concrete mixture is discharged from drum 14 onto a discharged chute 16 for delivery, such as for example into a concrete pump or a bucket (not shown). Discharge chute 16 includes an upper main chute segment 18 and a lower end chute segment 20. End chute segment 20 is hingeably connected to the main chute segment 18 for relative rotation about a transverse hinge axis between a lowered position where the main chute segment and the end chute segment form an elongated chute, and a raised position where the end chute segment is positioned above the main chute segment. In FIG. 1, end chute segment 20 is shown in the raised position where it is located directly above the main chute segment 18. This is the typical position used when the concrete truck 12 is traveling.

Figure 2:
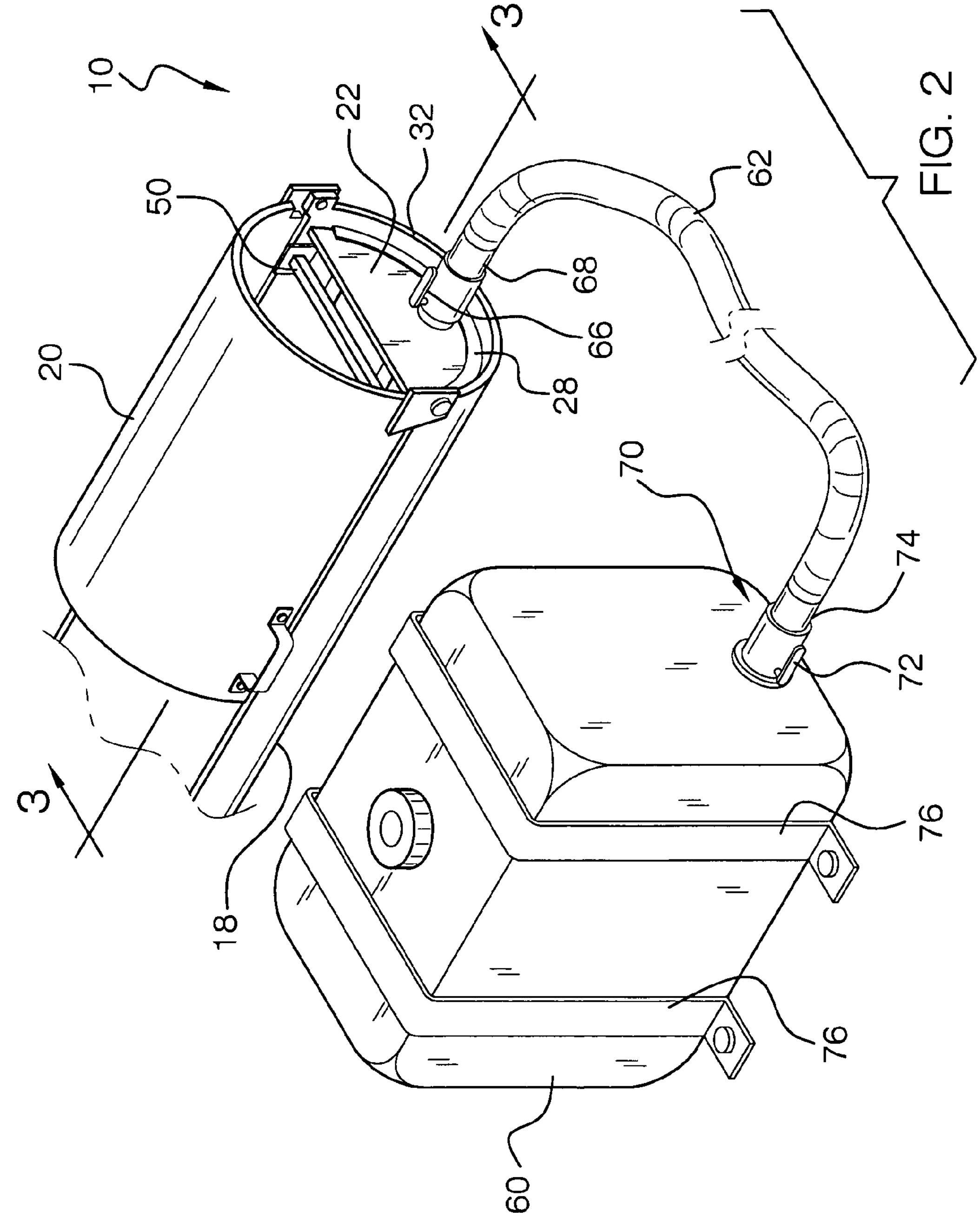
FIG. 2 is a diagrammatic perspective view of the concrete containment and washout apparatus, including a partial perspective of a concrete chute.
Figure 4:
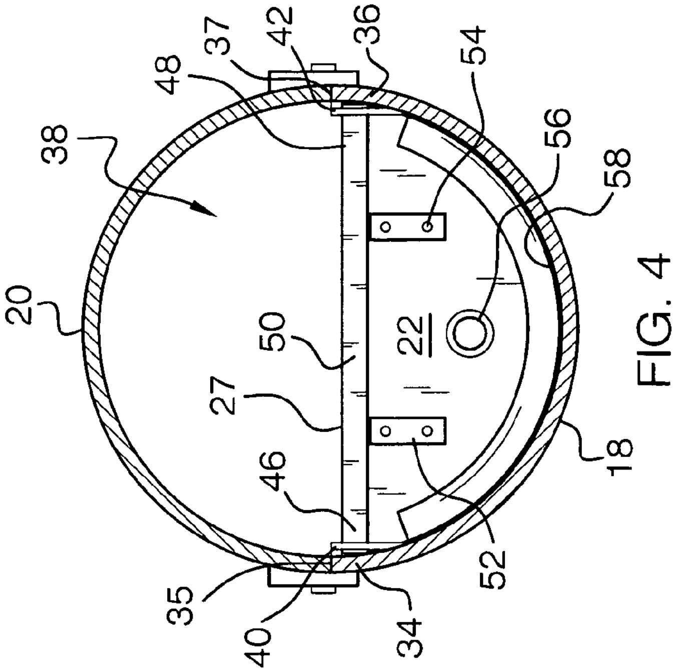
FIG. 4 is a cross-sectional view taken along line 4-4 in FIG. 3 illustrating the end chute in the raised position with the barrier plate positioned within the main chute.
Figure 3:
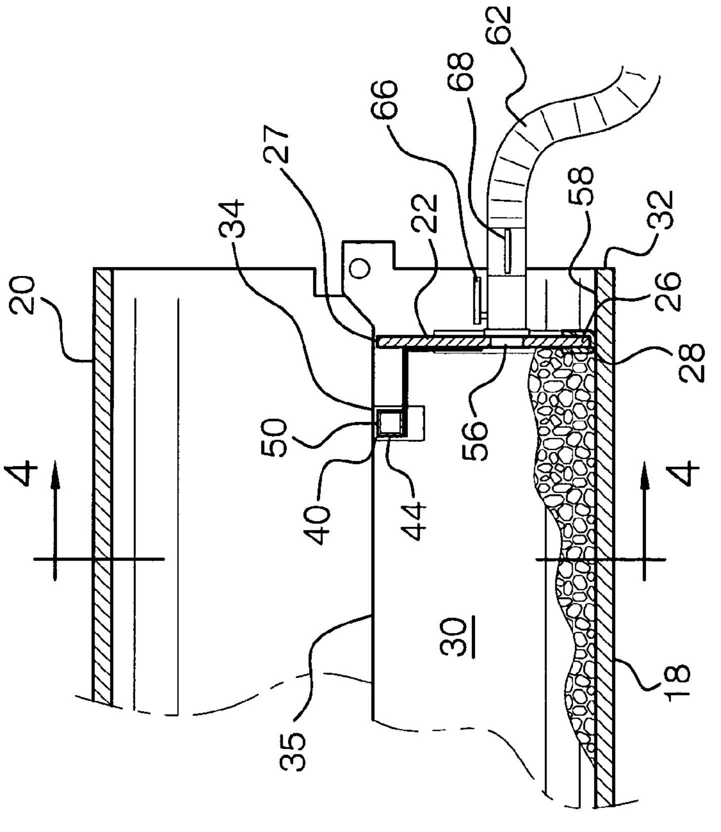
FIG. 3 is a cross-sectional view taken along line 3-3 in FIG. 2 illustrating the end chute in the raised position with the barrier plate positioned within the main chute and blocking material flow therein.
Figure 5:
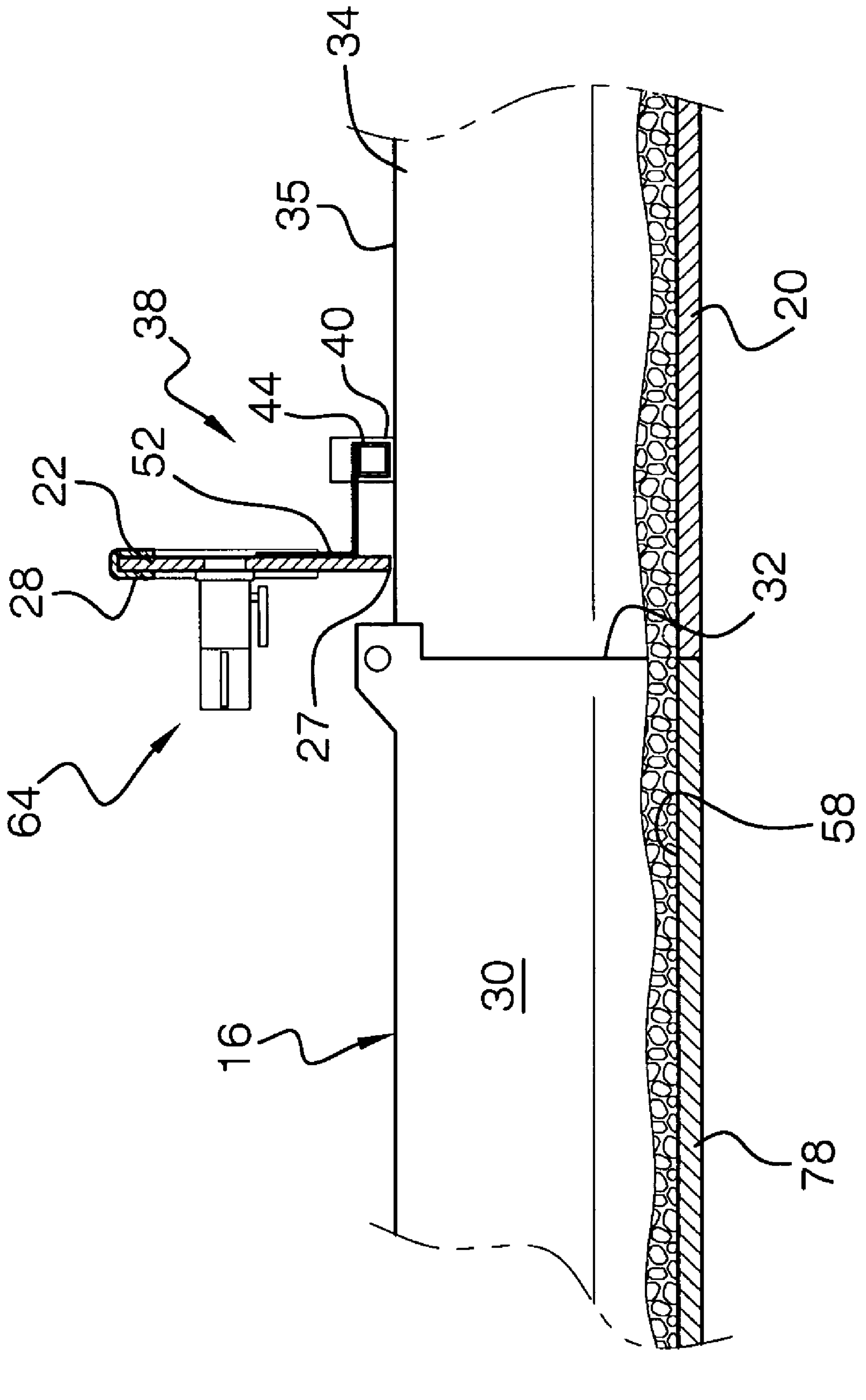
FIG. 5 is a cross-section view similar to FIG. 3, but illustrating the end chute in the lowered position with the barrier plate removed from the main chute.

With reference to FIGS. 2-4, the concrete containment and chute washout apparatus 10 includes a barrier plate 22 fixedly connected to end chute 20 to remain stationary with respect thereto and to rotate therewith. When end chute 20 is rotated into the raised position, as best depicted in FIGS. 3 and 4, barrier plate 22 lowered into position within and transversely across main chute 18 and effectively provides a barrier against the flow of material 24 in the main chute. When end chute 20 is rotated into the lowered position, as best depicted in FIG. 5, barrier plate 22 is raised into position above main chute 18. In this position, main chute 18 and end chute 20 form an elongated discharge chute through which material is free to flow. The barrier plate 22 is a relatively thin plate of a rigid material of sufficient strength to support against material flow through main chute 18. The barrier plate 22 can be constructed of a high strength plastic, metal, composites or the like.

Barrier plate 22 is attached to opposed sides 34 and 36 of end chute 18 to extend transversely therebetween. While barrier plate 22 can be attached to end chute 18 using threaded fasteners, by welding or riveting, preferably, barrier plate 22 is attached to end chute 18 through a support 38, which permits barrier plate 22 to be attached or removed without tools. In the preferred embodiment, support 38 includes a pair of plates 40 and 42 welded to sides 34 and 36, respectively. Each plate 40 and 42 includes an opening 44 through which opposed ends 46 and 48 of a cross-bar 50 are removably insertable. Securment pins 52 and 54 are used to prevent withdrawal of ends 46 and 48 from plates 40 and 42. Barrier plate 22 can be attached to cross-bar 50 by a pair of brackets 52 and 54. Alternatively, barrier plate 22 could be welded, riveted or otherwise fixedly secured to cross-bar 50.

Barrier plate 22 includes a peripheral sealing edge 26 to which is attached a seal 28. Seal 28 provides sealing contact between sealing edge 26 and interior surface 30 of the main chute 18 when end chute 20 is in the lowered position, and barrier plate 22 is positioned in the main chute 18. In this manner, a water tight barrier is formed across the main chute 18 to prevent the flow of material and fluid out end 32 thereof. The peripheral sealing edge 26 is arcuate shaped to form complementary reception within the concave interior surface 30 of the main chute 18. In an embodiment, top edge 27 of the barrier plate may be straight, as shown. In other embodiments, top edge 27 can be arcuate shaped. Preferably, barrier plate 22 is attached to end chute 20 with top edge 27 even with or raised slightly above edges 35 and 37 of sides 34 and 36 respectively.

A fluid passage 56 is formed through barrier plate 22 an inward position from sealing edge 26 to be elevated or spaced from the interior surface 30 of the main chute 18 when end cute 18 is in the raised position. Preferably, fluid passage 56 is spaced a minimum of three-inches from bottom 58 of main chute 18 to cause solid debris to accumulate within the main chute and permit fluid to flow through the fluid passage.

A fluid collection tank 60 is positionable remotely of barrier plate 22 and can be attached to the concrete truck 12, as best depicted in FIGS. 1 and 2. A conduit, such as flexible hose 62 is connectable to fluid passage 56 and to fluid collection tank 60 to permit the passage of fluid from the main chute 18 into the fluid collection tank when end chute 20 is in the raised position. Hose 62 can be connected to fluid passage 56 by a coupling 64, which can include a valve 66 and a quick-disconnect hose fitting 68. Likewise, hose 62 can be connected in fluid communication with fluid collection tank 60 by coupling 70, which can include a valve 72 and quick-disconnect hose fitting 74. Fluid collection tank 60 can be secured to the concrete truck 12 by a pair of transversely extending tie-down straps 76.

In use, it can now be understood, to deliver a load of concrete, end chute 20 rotated into the lowered position to form concrete chute 16, as best seen in FIG. 5. In this position, main chute 18 is not blockaded by barrier plate 22, and thus concrete can freely flow down concrete chute 16. Once the concrete has been delivered and to prevent discharge of residual concrete remaining in the concrete chute 16, end chute 20 is rotated into the raised position, which positions barrier plate 22 transversely across main chute 18, and effectively closing off the chute. In this position, residual concrete in the main chute 18 is prevented from running off onto the concrete truck 12, the delivery site, or roadways. Hose 62 can be connected between the barrier plate 22 and the collection tank 60 to permit rinsing the main chute 18 with wash water to prevent hardening of residual concrete to the main chute. During rinsing, wastewater is transferred from the main chute 18 to the collection tank 60 through the barrier plate 22 via fluid passage 56 and hose 62. Large debris, such as aggregate is caused to remain in the main chute 18 due the positioning of fluid passage 56.

A number of embodiments of the present invention have been described. Nevertheless, it will be understood that various modifications may be made without departing from the spirit and scope of the invention. Accordingly, other embodiments are within the scope of the following claims.

What is claimed is:

1. A concrete containment and chute washout apparatus for use in association with a concrete truck having a concrete discharge chute with a main chute and an end chute hingeable connected to the main chute for rotation between a lowered positioned where the main chute and end chute form an elongated chute for concrete discharge, and a raised position where the end chute is positioned above the main chute, the apparatus comprising:

a barrier plate having a peripheral sealing edge, and a fluid passage through said barrier plate at an inwardly position from said peripheral sealing edge;

a seal located along said peripheral sealing edge;

said barrier plate connectable to said end chute such that when said end chute is in the raised position, said barrier plate is positioned within said main chute with said seal providing a sealing contact between said peripheral sealing edge and an interior surface of said main chute forming a liquid tight barrier against the flow of material in said main chute;

a container positionable remotely of said barrier plate; and a hose connectable to in fluid communication to said fluid passage and to said container for the passage of material from said main chute to said container.

2. The apparatus of claim 1, further comprising:

a valve interconnectable between said fluid passage and said hose.

3. The apparatus of claim 1, wherein said main chute include a proximal end, and wherein said barrier plate is position within said main chute about said proximal end when said end chute is in the raise position.

4. The apparatus of claim 1, wherein said fluid passage is spaced inwardly approximately three-inches from said peripheral sealing edge.

5. The apparatus of claim 1, further comprising:

a pair of attachment brackets securable to opposite lateral sides of said end chute;

a cross-bar having opposed ends removably receivable by said pair of attachment brackets such that said cross-bar extends transversely across said end chute; and wherein said barrier plate is fixedly secured to said cross-bar.

6. The apparatus of claim 5, wherein each attachment bracket includes a through hole into which an end of said opposed ends of said cross-bar is insertable.

7. A concrete containment and washout apparatus, comprising in combination:

a concrete truck having a concrete mixing drum;

a concrete discharge chute attached to said concrete truck positioned to receive concrete from the mixing drum and discharge the concrete remotely of the mixing drum, said concrete discharge chute having a main chute and an end chute hingeable connected to the main chute for rotation between a lowered positioned where the main chute and end chute form an elongated chute for the discharge of concrete, and a raised position where the end chute is positioned above the main chute;

a barrier plate having a peripheral sealing edge, and a fluid passage through said barrier plate at an inwardly position from said peripheral sealing edge;

a seal located along said peripheral sealing edge;

a pair of attachment brackets secured to opposite lateral sides of said end chute;

a cross-bar having opposed ends removably receivable by said pair of attachment brackets such that said cross-bar extends transversely across said end chute;

said barrier plate being fixedly secured to said cross-bar such that when said end chute is in the raised position, said barrier plate is positioned within said main chute with said seal providing a sealing contact between said peripheral sealing edge and an interior surface of said main chute forming a liquid tight barrier against the flow of material in said main chute;

a container secured to said concrete truck remotely of said barrier plate; and a hose connected in fluid communication to said fluid passage and to said container for the passage of material from said main chute to said container.

* * * * *